US012719951B2

(12) United States Patent
Kim et al.

(10) Patent No.: US 12,719,951 B2
(45) Date of Patent: Aug. 25, 2026

(54) MOBILE ROBOT AND CONTROL METHOD THEREOF

(71) Applicants: Hyundai Motor Company, Seoul (KR); Kia Corporation, Seoul (KR)

(72) Inventors: Yun Jae Kim, Seongnam-si (KR); Myung Hwa Ji, Suwon-si (KR); Jin Woo Kim, Seoul (KR); Jung Min Ryu, Hwaseong-si (KR); Seok Won Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 7 days.

(21) Appl. No.: 18/432,513

(22) Filed: Feb. 5, 2024

(65) Prior Publication Data

US 2025/0088557 A1 Mar. 13, 2025

(30) Foreign Application Priority Data

Sep. 13, 2023 (KR) ........................ 10-2023-0122057

(51) Int. Cl.
*H04L 67/12* (2022.01)
*H04B 17/318* (2015.01)
*H04L 69/18* (2022.01)

(52) U.S. Cl.
CPC ........... *H04L 67/12* (2013.01); *H04B 17/328* (2023.05); *H04L 69/18* (2013.01)

(58) Field of Classification Search
CPC ..... H04B 17/318; H04B 17/328; H04L 67/12; H04L 69/18; H04W 76/10; H04W 24/10; H04W 92/18; H04W 4/46; H04W 84/005
See application file for complete search history.

(56) References Cited

U.S. PATENT DOCUMENTS

| | | | | |
|---|---|---|---|---|
| 10,820,259 B2 * | 10/2020 | Hassan | ................. | H04W 76/10 |
| 11,140,738 B1 * | 10/2021 | Rane | ..................... | H04W 76/14 |
| 2011/0245996 A1 * | 10/2011 | Orsulak | ................. | G05D 1/101 701/2 |
| 2016/0034363 A1 * | 2/2016 | Poledna | ............. | G06F 11/2005 714/4.2 |
| 2017/0135543 A1 * | 5/2017 | Halloran | .................. | B25J 5/007 |
| 2018/0206287 A1 * | 7/2018 | Jiang | ..................... | H04W 76/27 |
| 2019/0045432 A1 * | 2/2019 | Hassan | ................. | H04W 48/16 |
| 2019/0092345 A1 * | 3/2019 | Zhu | ...................... | G05D 1/0038 |
| 2019/0331501 A1 * | 10/2019 | Wang | ................... | G05D 1/0274 |
| 2019/0373440 A1 * | 12/2019 | Agiwal | ................ | H04W 76/10 |

(Continued)

FOREIGN PATENT DOCUMENTS

| | | | | |
|---|---|---|---|---|
| KR | 20230035871 A | 3/2023 | | |
| WO | WO-2021159982 A1 * | 8/2021 | .......... | H04W 72/563 |

*Primary Examiner* — Tonia L Dollinger
*Assistant Examiner* — Linh T. Nguyen
(74) *Attorney, Agent, or Firm* — Slater Matsil, LLP

(57) ABSTRACT

An embodiment robot includes a communication device configured to communicate with a control server based on a first communication protocol and a second communication protocol, a network device configured to determine a network connection state between the communication device and the control server based on a setting of the first communication protocol and a setting of the second communication protocol, and a controller configured to control an operation of the robot based on the network connection state determined by the network device.

20 Claims, 9 Drawing Sheets

(56) References Cited

U.S. PATENT DOCUMENTS

| | | | | |
|---|---|---|---|---|
| 2020/0220888 | A1* | 7/2020 | Terazawa | B60T 17/221 |
| 2020/0233436 | A1 | 7/2020 | Fox et al. | |
| 2020/0260308 | A1* | 8/2020 | Jin | H04L 1/0026 |
| 2021/0360621 | A1* | 11/2021 | Jiang | H04W 52/0216 |
| 2022/0011770 | A1* | 1/2022 | Tsuchiya | H04Q 9/00 |
| 2022/0124543 | A1* | 4/2022 | Orhan | G06N 3/006 |
| 2023/0030446 | A1* | 2/2023 | Lei | G07C 5/0808 |
| 2023/0072163 | A1 | 3/2023 | Lim | |
| 2023/0114277 | A1 | 4/2023 | Deshmukh | |
| 2023/0336318 | A1* | 10/2023 | Atawia | H04L 5/0073 |
| 2024/0244703 | A1* | 7/2024 | Tseng | H04B 17/328 |
| 2024/0411327 | A1* | 12/2024 | Zhang | G06F 11/0793 |
| 2025/0048148 | A1* | 2/2025 | Xu | H04W 52/0235 |
| 2025/0048473 | A1* | 2/2025 | Shrivastava | H04W 76/30 |
| 2025/0350383 | A1* | 11/2025 | Lutchoomun | H03M 13/612 |

* cited by examiner

810

RSRP

| RSRP | Signal strength | Description |
| --- | --- | --- |
| ≥-80 dBm | Excellent | Strong signal with maximum data speeds |
| -80 dBm to -90 dBm | Good | Strong signal with good data speeds |
| -90 dBm to -100 dBm | Fair to poor | Reliable data speeds may be attained, but marginal data with drop-outs is possible. When this value gets close to-100, performance will drop drastically |
| ≤-100 dBm | No signal | Disconnection |

820

RSRQ

| RSRQ | Signal strength | Description |
| --- | --- | --- |
| ≥-10 dBm | Excellent | Strong signal with maximum data speeds |
| -10 dBm to -15 dBm | Good | Strong signal with good data speeds |
| -15 dBm to -20 dBm | Fair to poor | Reliable data speeds may be attained, but marginal data with drop-outs is possible. When this value gets close to-20, performance will drop drastically |
| ≤-20 dBm | No signal | Disconnection |

FIG.8

MOBILE ROBOT AND CONTROL METHOD THEREOF

CROSS-REFERENCE TO RELATED APPLICATIONS

This application claims the benefit of Korean Patent Application No. 10-2023-0122057, filed on Sep. 13, 2023, which application is hereby incorporated herein by reference.

TECHNICAL FIELD

The present disclosure relates to robots and robot control methods.

BACKGROUND

When a control server controls a robot, the control server may monitor on/offline states of the robot and may determine a real-time location of the robot through various sensor values with respect to the robot. The control server may manage or control the robot when the robot is online and may manually move the robot's location by identifying a map.

However, network disconnection between the robot and the control server may cause problems of reduced safety, making it impossible to control or monitor the robot through the control server, as it is impossible to determine the current location of the robot or the current state of the robot.

In addition, the network disconnection between the robot and the control server may cause problems of reduced productivity and efficiency, as in a system that controls multiple robots, a robot that does not receive commands may remain in an infinite standby state. For example, when one robot goes offline and stops in a limited space, movement of other robots may become impossible or it may cause great inconvenience to people's walking.

To solve these problems, in a situation where the network between the robot and the control server is disconnected, it is necessary to develop technologies that may perform evasive movement commands defined according to the mechanism received from the control server so as to ensure the stability of robots and to supplement the quality of service.

SUMMARY

The present disclosure relates to robots and robot control methods. Particular embodiments relate to technology for controlling a robot based on a network connection state of the robot.

Embodiments of the present disclosure can solve problems occurring in the prior art while advantages achieved by the prior art are maintained intact.

An embodiment of the present disclosure provides a robot and a robot control method that may be suitable for large-scale communication processing, may be optimized for high throughput and real-time data processing, may operate asynchronously, may support bidirectional streams by communicating with a control server based on a first communication protocol and a second communication protocol, may compensate for the shortcomings of the general MQTT protocol, and may prevent the robot from receiving incorrect commands by minimizing data loss.

In addition, an embodiment of the present disclosure provides a robot and a robot control method that may perform exception scenarios for commands being executed and may ensure robot safety and service quality by determining the network connection state at least twice based on the settings of the first communication protocol and the settings of the second communication protocol.

In addition, an embodiment of the present disclosure provides a robot and a robot control method that may control the operation of the robot based on the network connection state determined by the network device, may perform synchronization with the control server when the network connection state is restored from the offline state to the online state, and may automatically resume the last command and/or task being performed.

The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, a robot includes a communication device that communicates with a control server based on a first communication protocol and a second communication protocol, a network device that determines a network connection state between the communication device and the control server based on a setting of the first communication protocol and a setting of the second communication protocol, and a controller that controls an operation of the robot based on the network connection state determined by the network device.

According to an embodiment, the communication device may receive a command set including a movement command from the control server, an effective time of the movement command, a unique identifier of the movement command, and whether to move offline based on when the network connection state between the communication device and the control server is online, may determine whether the effective time of the movement command is valid by comparing a difference between a first time at which the movement command is received and a second time following the first time with the effective time of the movement command, and may determine whether the unique identifier of the movement command is unique by comparing the unique identifier of the movement command with identifiers included in storage of the robot and corresponding to commands different from the movement command.

According to an embodiment, the communication device may receive the command set from the control server based on the first communication protocol and may transmit the command set to the controller based on when the effective time of the movement command is valid and the unique identifier of the movement command is unique, and the controller may control the operation of the robot based on the movement command included in the command set when the command set from the communication device is received.

According to an embodiment, the robot may further include an LTE (Long-Term Evolution) router that performs communication with the network device, and the network device may obtain a reference signal received power (RSRP) and a reference signal received quality (RSRQ) of the LTE router based on when the communication device receives a command set from the control server and the command set is transmitted to the controller, and may determine the network connection state between the communication device and the control server as an offline state based on when the RSRP is less than or equal to a first threshold and the RSRQ is less than or equal to a second threshold different from the first threshold.

According to an embodiment, the network device may determine the network connection state between the communication device and the control server as an online state, based on whether the RSRP exceeds the first threshold or the RSRQ exceeds the second threshold, and may re-determine the network connection state between the communication device and the control server, based on the setting of the first communication protocol and the setting of the second communication protocol, when the network connection state between the communication device and the control server is determined as the online state.

According to an embodiment, the network device may transmit random dummy data to the control server at predetermined time intervals based on the first communication protocol, may increase the count data at predetermined unit intervals based on when a transmission time of the dummy data exceeds a first target threshold, and may re-determine the network connection state between the communication device and the control server as the offline state based on when the count data exceeds a second target threshold.

According to an embodiment, the network device may transmit the random dummy data to the control server at predetermined time intervals based on the second communication protocol and may re-determine the network connection state between the communication device and the control server as the offline state based on when the dummy data is not transmitted to the control server.

According to an embodiment, the controller may store collected data obtained by the robot from a target time when the network connection state between the communication device and the control server is determined as an offline state, may skip the movement command when the robot is in a stationary state from the target time, and may control the operation of the robot depending on whether the offline movement is performed based on when the movement command is skipped.

According to an embodiment, the controller may control the operation of the robot such that the robot is to be moveable to a predetermined waiting location when a value of whether to move offline indicates that the robot is to be moveable, and the controller may control the operation of the robot at a location of the robot when the value of whether to move offline indicates that the robot is not to be moveable.

According to an embodiment, the controller may transmit collected data obtained and stored by the robot to the communication device, from a first time when the network connection state between the communication device and the control server is determined as an offline state to a second time when the network connection state between the communication device and the control server is changed from the offline state to an online state, and the communication device may request synchronization between the control server and the robot by transmitting the stored collected data to the control server.

According to an embodiment of the present disclosure, a method of controlling a robot includes communicating with a control server based on a first communication protocol and a second communication protocol, determining a network connection state between a communication device and a control server based on a setting of the first communication protocol and a setting of the second communication protocol, and controlling an operation of a robot based on the network connection state determined by the network device.

According to an embodiment, the communicating with the control server may include receiving a command set including a movement command from the control server, an effective time of the movement command, a unique identifier of the movement command, and whether to move offline based on when the network connection state between the communication device and the control server is online, determining the effective time of the movement command is valid by comparing a difference between a first time at which the movement command is received and a second time following the first time with the effective time of the movement command, and determining whether the unique identifier of the movement command is unique by comparing the unique identifier of the movement command with identifiers included in storage of the robot and corresponding to commands different from the movement command.

According to an embodiment, the receiving of the command set may include receiving the command set from the control server based on the first communication protocol, transmitting the command set to the controller based on when the effective time of the movement command is valid and the unique identifier of the movement command is unique, and controlling the operation of the robot based on the movement command included in the command set.

According to an embodiment, the determining of the network connection state may include obtaining a reference signal received power (RSRP) and a reference signal received quality (RSRQ) of an LTE router, based on when the communication device receives a command set from the control server and the command set is transmitted to the controller, and determining the network connection state between the communication device and the control server as an offline state based on when the RSRP is less than or equal to a first threshold and the RSRQ is less than or equal to a second threshold different from the first threshold.

According to an embodiment, the method of controlling the robot may further include determining the network connection state between the communication device and the control server as an online state, based on the RSRP exceeding the first threshold or the RSRQ exceeding the second threshold, and re-determining the network connection state between the communication device and the control server based on the setting of the first communication protocol and the setting of the second communication protocol when the network connection state between the communication device and the control server is determined as the online state.

According to an embodiment, the re-determining of the network connection state may include transmitting random dummy data to the control server at predetermined time intervals based on the first communication protocol, increasing count data at predetermined unit intervals based on when a transmission time of the dummy data exceeds a first target threshold, and re-determining the network connection state between the communication device and the control server as the offline state based on when the count data exceeds a second target threshold.

According to an embodiment, the re-determining of the network connection state may include transmitting random dummy data to the control server at predetermined time intervals based on the second communication protocol and re-determining the network connection state between the communication device and the control server as the offline state based on when the dummy data is not transmitted to the control server.

According to an embodiment, the method of controlling the robot may further include storing collected data obtained by the robot from a target time when the network connection state between the communication device and the control server is determined as an offline state, skipping the movement command when the robot is in a stationary state from the target time, and controlling the operation of the robot depending on whether the offline movement is performed based on when the movement command is skipped.

According to an embodiment, the controlling of the operation of the robot may include controlling the operation of the robot such that the robot is to be moveable to a predetermined waiting location when a value of whether to move offline indicates that the robot is to be moveable and controlling the operation of the robot at a location of the robot when the value of whether to move offline indicates that the robot is not to be moveable.

According to an embodiment, the method of controlling the robot may further include transmitting collected data obtained and stored by the robot to the communication device, from a first time when the network connection state between the communication device and the control server is determined as an offline state to a second time when the network connection state between the communication device and the control server is changed from the offline state to an online state, and requesting synchronization between the control server and the robot by transmitting the stored collected data to the control server.

BRIEF DESCRIPTION OF THE DRAWINGS

The above and other objects, features, and advantages of embodiments of the present disclosure will be more apparent from the following detailed description taken in conjunction with the accompanying drawings, in which:

FIG. 8 is a diagram illustrating characteristics of RSRP and RSRQ of an LTE router included in a robot according to an embodiment of the present disclosure.

In connection with the description of the drawings, the same or similar reference numerals may be used for the same or similar components.

DETAILED DESCRIPTION OF ILLUSTRATIVE EMBODIMENTS

Figure 1:
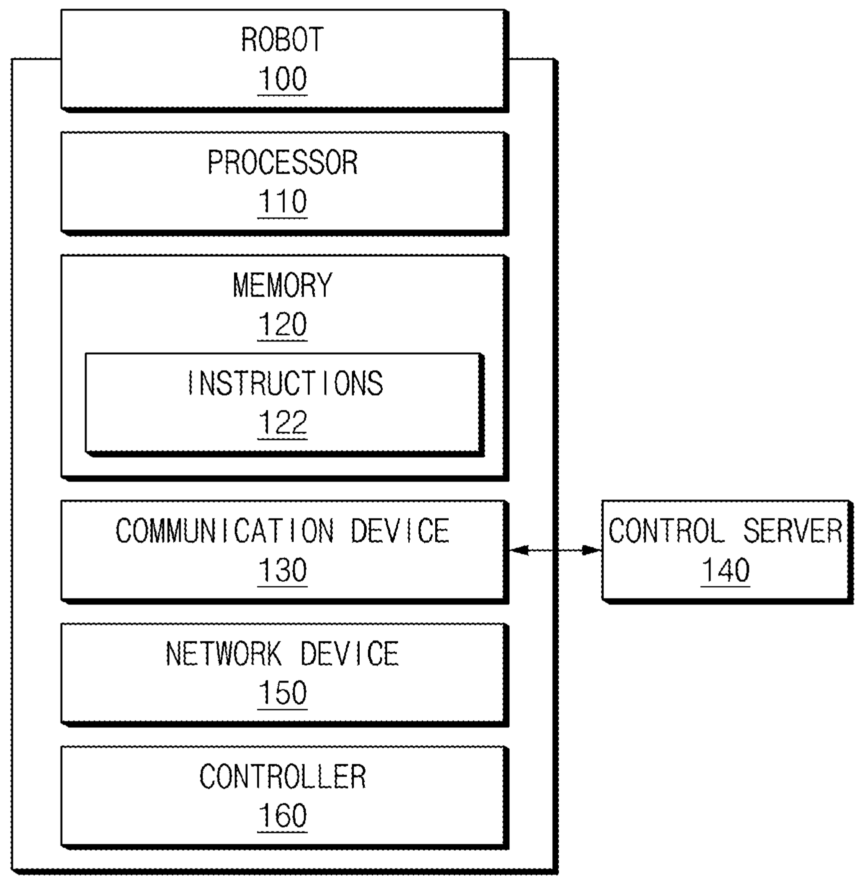
FIG. 1 is a diagram illustrating a configuration of a robot according to an embodiment of the present disclosure.

Hereinafter, embodiments of the present disclosure will be described in detail with reference to the accompanying drawings. In adding the reference numerals to the components of each drawing, it should be noted that the identical or equivalent component is designated by the identical numeral even when it is displayed on other drawings. In addition, a detailed description of well-known features or functions will be omitted in order not to unnecessarily obscure the gist of the embodiments of the present disclosure. Particularly, various embodiments of the present disclosure may be described with reference to the accompanying drawings. Accordingly, those of ordinary skill in the art will recognize that modifications, equivalents, and/or alternatives of the various embodiments described herein may be variously made without departing from the scope and spirit of the present disclosure. With regard to description of drawings, similar components may be marked by similar reference numerals.

In describing components of embodiments of the present disclosure, the terms first, second, A, B, (a), (b), and the like may be used herein. These terms are merely intended to distinguish the components from other components, and the terms do not limit the nature, order, or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. For example, expressions such as “first”, “second”, “the first”, “the second”, or the like used herein may indicate various components regardless of order and/or importance and are only used to distinguish one component from another component and do not limit the components. For example, “a first user device” and “a second user device” may indicate different user devices regardless of the order or priority thereof. For example, without departing from the scope of the present disclosure, a first component may be referred to as a second component, and similarly, a second component may be referred to as a first component.

In the present disclosure, the expressions “have”, “may have”, “include” and “comprise”, or “may include” and “may comprise” used herein indicate the existence of corresponding features (e.g., elements such as numeric values, functions, operations, or components) but do not exclude the presence of additional features.

It should be understood that when a component (e.g., first component) is referred to as being “operatively or communicatively coupled with/to” or “connected to” another component (e.g., a second component), the component may be directly connected to the another component or may be connected through another component (e.g., a third component). In contrast, when a component (e.g., a first component) is referred to as being “directly coupled with/to” or “directly connected to” another component (e.g., a second component), it should be understood that there is no intervening component (e.g., a third component).

According to the situation, the expression “configured to” used herein may be used as, for example, the expression “suitable for”, “having the capacity to”, “designed to”, “adapted to”, “made to”, or “capable of”.

The term “configured to (or set to)” should not mean only “specifically designed to” in hardware. Instead, in some situations, the expression “device configured to” may mean that the device is “capable of” working with other devices or components. For example, the phrase “processor configured to (or set to) perform A, B, and C" may mean a dedicated processor (e.g., an embedded processor) for performing a corresponding operation or a generic-purpose processor (e.g., a central processing unit (CPU) or an application processor) which is capable of performing corresponding operations by executing one or more software programs which are stored in a memory device. Terms used herein are merely used to describe specific embodiments and may not be intended to limit the scope of other embodiments. Singular expressions may include plural expressions unless the context clearly indicates otherwise. All the terms used herein, which include technical or scientific terms, may have the same meaning that is generally understood by a person skilled in the art described in the specification. It will be further understood that terms, which are defined in a dictionary and commonly used, should also be interpreted as is customary in the relevant related art and not in an idealized or overly formal manner unless expressly so defined herein in various embodiments of the present disclosure. In some cases, even though terms are terms which are defined in the specification, they may not be interpreted to exclude embodiments of the present disclosure.

In the disclosure disclosed herein, the expressions "A or B", "at least one of A or/and B", or "one or more of A or/and B", and the like may include any and all possible combinations of items listed together. For example, the term "A or B", "at least one of A and B", or "at least one of A or B" may refer to all of the case (1) where at least one A is included, the case (2) where at least one B is included, or the case (3) where both of at least one A and at least one B are included. In addition, in describing the components of embodiments of the present disclosure, each of the phrases "A or B", "at least one of A and B", "at least one of A or B", "A, B, or C", "at least one of A, B, and C", "at least one of A, B, or C", and "at least one of A, B, C, or any combination thereof" may include any one of the items listed together with the corresponding phrase of the phrases or any possible combination thereof. In particular, the phrase such as "at least one of A, B, C, or any combination thereof" may include A or B or C or a combination thereof such as AB or ABC.

Hereinafter, embodiments of the present disclosure will be described in detail with reference to FIGS. 1 to 9.

FIG. 1 is a diagram illustrating a configuration of a robot according to an embodiment of the present disclosure.

A robot 100 according to an embodiment may include a processor 110, a memory 120 including instructions 122, a communication device 130, a network device 150, and a controller 160. However, not all of the illustrated components are essential components. A robot or a robot control system may be implemented with more components than those illustrated, or a robot or a robot control system may be implemented with fewer components than those illustrated.

The robot 100 is a robotic device that may move on its own using wheels, etc., and may represent a robot that may perform service operations required in a service space while moving through at least one or more service spaces. For example, since a space requiring a cleaning service may be a space requiring cleaning, such as a home or an office, and a space requiring a guidance service may be a space requiring guidance, such as a sales agency or an airport, the spaces in an embodiment are not limited thereto.

The processor 110 may execute software and may control at least one other component (e.g., a hardware or software component) connected to the processor 110. The processor 110 may also perform various data processing or operations. The processor 110 controls the overall operation of the robot 100. The processor 110 may perform a predetermined operation by executing instructions 122 or commands stored in the memory 120. In addition, the processor 110 controls the operations of components provided in the robot 100. For reference, the processor 110 may perform all operations performed by the robot 100. Therefore, for convenience of description, in this specification, the operations performed by the robot 100 are mainly described as operations performed by the processor 110.

In addition, in this specification, for convenience of description, the processor 110 is mainly described as a single processor, but it is not limited thereto. For example, the robot 100 may include at least one or more processors. Each of the at least one or more processors may perform all operations related to a robot control operation.

The memory 120 may temporarily and/or permanently store various data and/or information required to control and/or drive the robot 100. For example, the memory 120 may store a command set including a movement command, an effective time of the movement command, a unique identifier of the movement command, and whether to move offline.

The communication device 130 may communicate with an external device in a wired or wireless manner. The communication device 130 communicates with a user terminal (not illustrated) and a control server 140. The communication device 130 may communicate with the user terminal using a short-range communication method. For example, the communication device 130 communicates with the user terminal through a Bluetooth or Wi-Fi communication connection. In addition, the communication device 130 may communicate with the control server 140 using a long-distance communication method. For example, the communication device 130 communicates with an AP device through the Wi-Fi and communicates with the control server 140 through a long-distance communication network connected to the AP device.

The communication device 130 may include a wireless communication module (e.g., a cellular communication module, a short-range wireless communication module, or a global navigation satellite system (GNSS) communication module) or a wired communication module (e.g., a local area network (LAN) communication module or a power line communication module). In addition, the communication device 130 may perform short-range communication and may use, for example, Bluetooth, BLE (Bluetooth Low Energy), near field communication, WLAN, ZigBee, infrared data association (IrDA) communication, Wi-Fi direct (WFD), ultra-wideband (UWB), Ant+ communication, etc. The communication device 130 may perform long-distance communication and may communicate with an external device through, for example, a legacy cellular network, a 5G network, a next-generation communication network, an Internet, a computer network (e.g., LAN or WAN), etc.

The communication device 130 may establish communication with the user terminal, the robot 100, and the control server 140 under the control of the processor 110. In addition, the communication device 130 transmits control signals and data to the user terminal, the robot 100, and the control server 140, or the communication device 130 receives control signals and data from the user terminal, the robot 100, and the control server 140.

In particular, in this specification, the communication device 130 may be described as a communication device that communicates with the control server 140 based on a first communication protocol and a second communication protocol. For example, the first communication protocol may include a Kafka interface for a pub-sub model, and the second communication protocol may include an RSocket interface for byte stream transmission of a TCP. A detailed description regarding this will be provided later in FIG. 5 below.

The network device 150 may determine a network connection state between the communication device 130 and the control server 140 based on a setting of the first communication protocol and a setting of the second communication protocol. For example, unlike the communication device 130 that communicates with the control server 140, the network device 150 may determine the network connection state between the communication device 130 and the control server 140 and may transfer commands for controlling the operation of the robot 100 to the processor 110 or the controller 160 based on the determined network connection state. In addition, the network device 150 may transfer the network connection state to at least one or more components included in the robot 100 based on when the network connection state is determined as offline state. A detailed description regarding this will be provided later in FIG. 6 below.

The controller 160 may control the operation of the robot 100 based on the network connection state determined by the network device 150. In particular, the controller 160 may execute software and may control at least one other component (e.g., a hardware component or a software component) connected to the processor 110. Therefore, in this specification, for convenience of description, the operation performed by the controller 160 will be described as the same operation as the operation performed by the processor 110.

Figure 2:
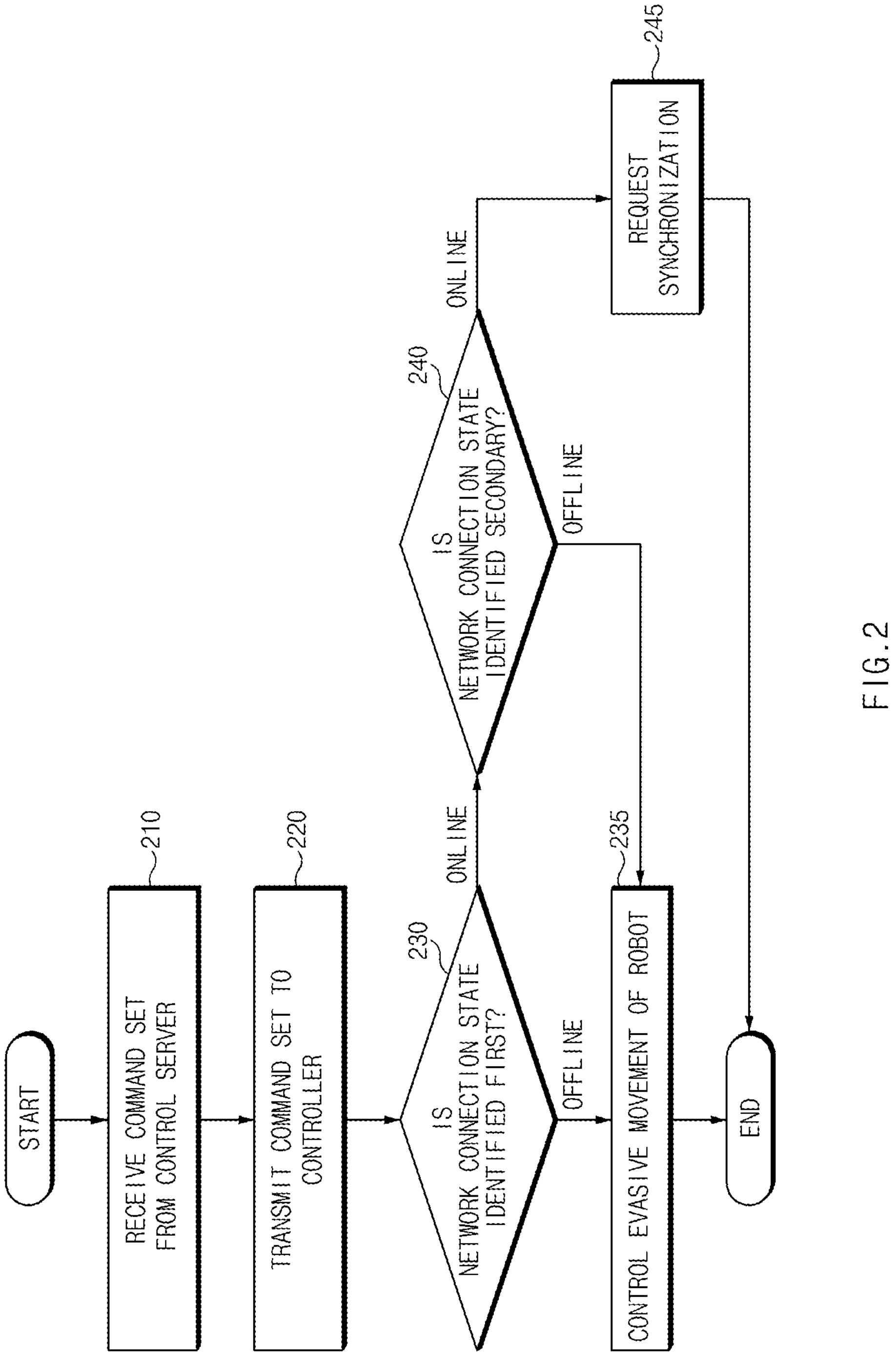
FIG. 2 is a flowchart describing a method for controlling a robot according to an embodiment of the present disclosure.

FIG. 2 is a flowchart describing a method for controlling a robot according to an embodiment of the present disclosure.

In operation 210, the communication device (e.g., the communication device 130 of FIG. 1) may receive a command set from the control server (e.g., the control server 140 of FIG. 1). For example, the communication device may receive a command set including a movement command from the control server, an effective time of the movement command, a unique identifier of the movement command, and whether to move offline based on when the network connection state between the communication device and the control server is online. A detailed description regarding this will be provided later in FIG. 4 below.

In operation 220, the communication device may transmit a command set to the controller (e.g., the controller 160 of FIG. 1). For example, the communication device may transmit the command set to the controller based on when the effective time of the movement command is valid and the unique identifier of the movement command is unique. The methods of determining the validity of the effective time and the uniqueness of the unique identifier will be described in detail later in FIG. 4 below.

In operation 230, the network device (e.g., the network device 150 in FIG. 1) may first determine (or identify) the network connection state. For example, the network device may first determine the network connection state based on characteristic values of the LTE router included in the robot (e.g., the robot 100 in FIG. 1), depending on when the communication device receives a command set from the control server and the command set is transmitted to the controller.

In operation 235, when the network connection state between the communication device and the control server is offline, the controller may control evasive movement of the robot. For example, the controller may control the evasive movement of the robot in the offline state based on a value of whether to move offline from the target time when the network connection state between the communication device and the control server is determined as an offline state. A detailed description regarding this will be provided later in FIG. 6 below.

In operation 240, when the network connection state between the communication device and the control server is online, the network device may secondarily determine (or identify) the network connection state. For example, when the network connection state between the communication device and the control server is determined as the online state, the network device may re-determine the network connection state between the communication device and the control server based on the setting of the first communication protocol and the setting of the second communication protocol. A detailed description regarding this will be provided later in FIG. 5 below.

In operation 245, when the network connection state between the communication device and the control server is online, the communication device may request synchronization to the control server. However, it is not limited to this, and the communication device may request synchronization to the control server when the network connection state between the communication device and the control server changes from offline to online. A detailed description regarding this will be provided later in FIG. 7 below.

Figure 3:
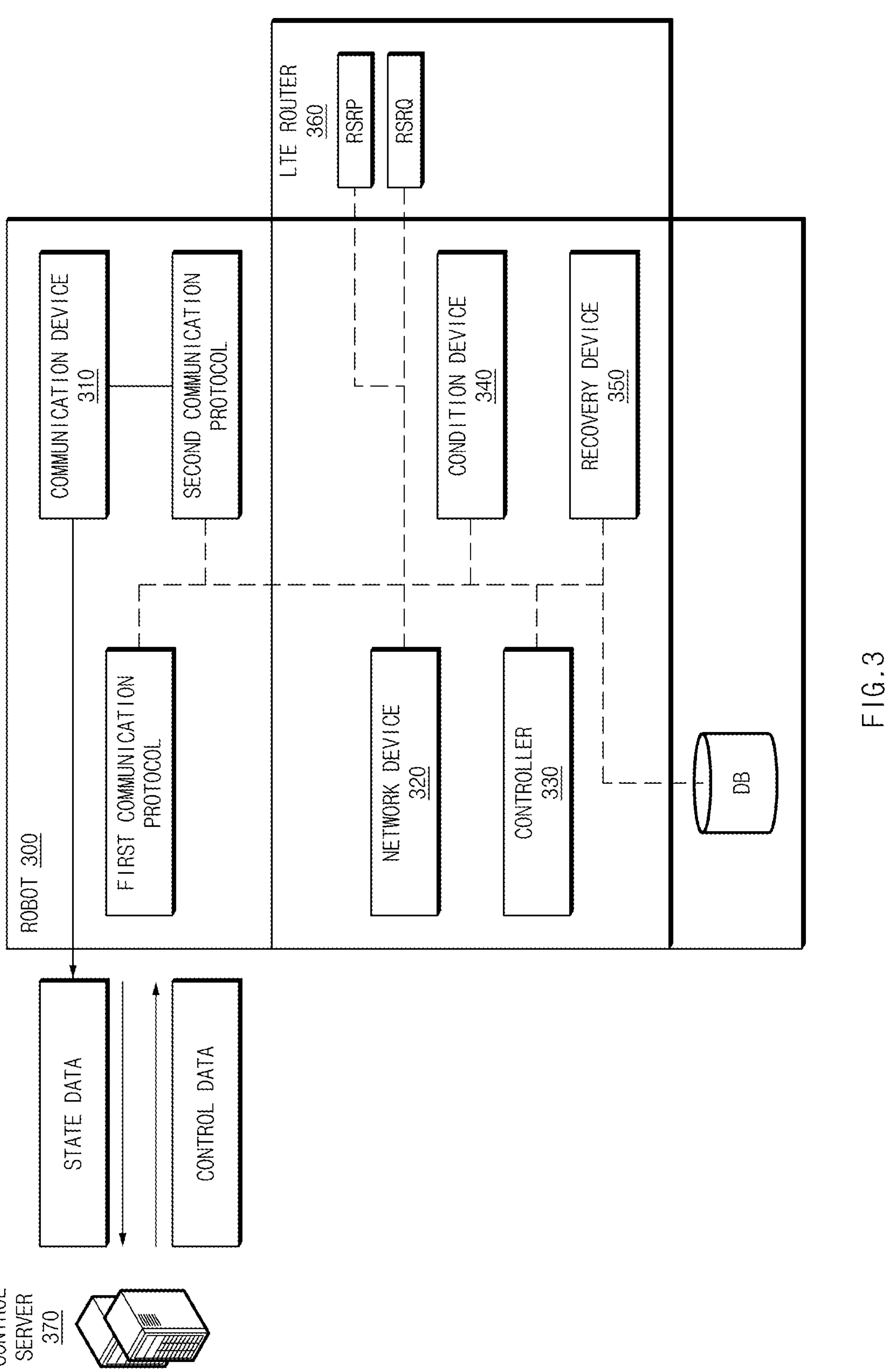
FIG. 3 is a diagram illustrating communication between a robot and a control server according to an embodiment of the present disclosure.

FIG. 3 is a diagram illustrating communication between a robot and a control server according to an embodiment of the present disclosure.

A robot 300 according to an embodiment may include a communication device 310, a network device 320, a controller 330, a condition device 340, a recovery device 350, and an LTE router 360. For example, the communication device 310, the network device 320, and the controller 330 may have the same configuration as the communication device, the network device, and the controller described in FIG. 1. The condition device 340 may determine an evasive movement condition (e.g., an evasive movement condition in the offline state) and may transmit a command corresponding to the evasive movement through the controller 330 when the condition is met. When the network connection state between the communication device 310 and a control server 370 changes from offline to online (i.e., a network restoration), the recovery device 350 may transmit a request to perform a state recovery of the robot 300 and the control server 370 to the controller 330.

The communication device 310 may transmit and receive state data (e.g., data including a state of the robot) and control data (e.g., data including control of the robot) with the control server 370 based on the first communication protocol and the second communication protocol.

The first communication protocol is a Kafka interface for the pub-sub model, which may support large-scale communication processing, real-time processing, stability, support of various communication patterns, and scalability. For example, the first communication protocol is a protocol suitable for large-scale communication processing and may handle thousands or more connections. The first communication protocol is optimized for high throughput and real-time data processing. The first communication protocol guarantees stable message delivery, supports patterns such as Publish-Subscribe, Queue, and Stream, and may increase scalability by forming a cluster.

The second communication protocol is the RSocket interface for byte stream transmission of TCP and may have asynchrony, efficiency, flexibility, and stability in the communication process. For example, the second communication protocol operates asynchronously, supports bidirectional streams, and may have less overhead compared to HTTP/1.1, HTTP/2, and WebSocket. In addition, the second communication protocol may support various communication patterns such as Request-Response, Request-Stream, Channel, and Fire-and-Forget, may reconnect connections that are broken during communication, and thus may enable continuous communication without message loss.

Figure 4:
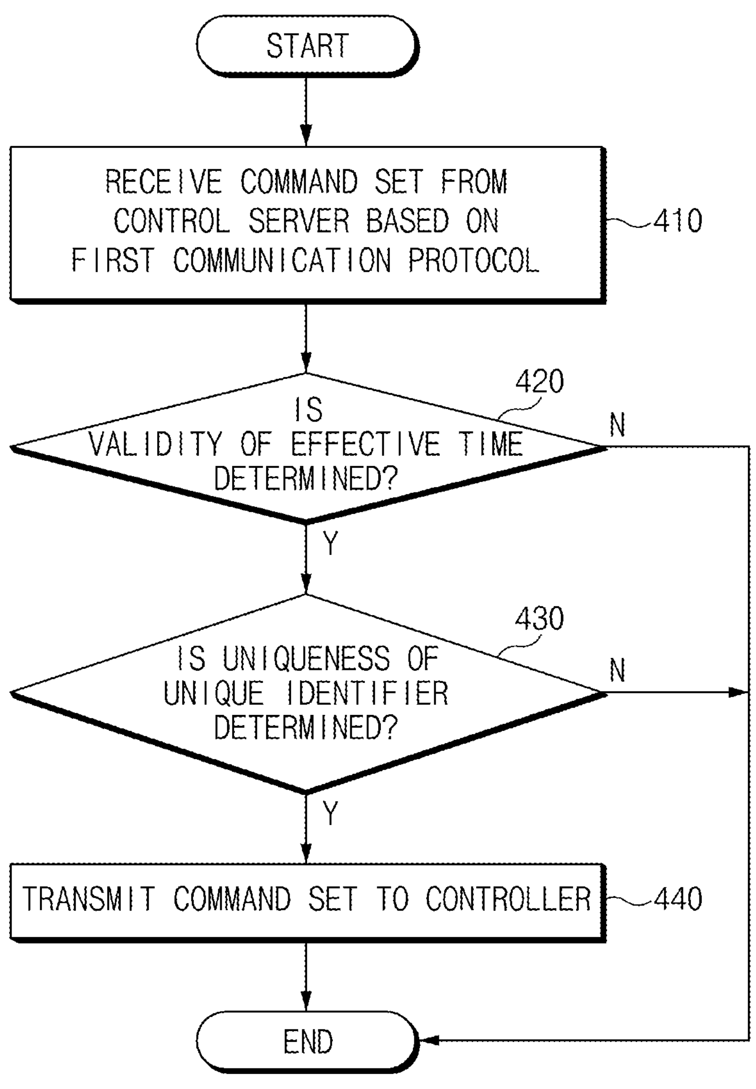
FIG. 4 is a flowchart describing a method of transmitting a command set to a controller in a robot according to an embodiment of the present disclosure.

FIG. 4 is a flowchart describing a method of transmitting a command set to a controller in a robot according to an embodiment of the present disclosure.

In operation 410, the communication device (e.g., the communication device 130 of FIG. 1) may receive a command set from the control server (e.g., the control server 140 of FIG. 1) based on the first communication protocol. For example, the communication device may receive a command set including a movement command from the control server, an effective time of the movement command, a unique identifier of the movement command, and whether to move offline based on when the network connection state between the communication device and the control server is online. In particular, the communication device may receive a command set based on a first communication protocol related to the Kafka interface running in a background of the robot.

In operation 420, the communication device may determine the validity of the effective time. For example, the communication device may determine whether the effective time of the movement command is valid by comparing a difference between a first time when the movement command is received and a second time following the first time with the effective time of the movement command. In this case, the second time may represent the time at which it is determined whether the effective time of the movement command is valid. When the difference between the first time and the second time exceeds the effective time of the movement command, the controller (e.g., the controller 160 in FIG. 1) may determine that the effective time of the movement command is invalid and may terminate the operation. Alternatively, when the difference between the first time and the second time is less than or equal to the effective time of the movement command, the controller may determine that the effective time of the movement command is valid.

In operation 430, the communication device may determine the uniqueness of the unique identifier. For example, the communication device may determine whether the unique identifier of the movement command is unique by comparing the unique identifier of the movement command with identifiers that are included in storage of the robot and correspond to commands different from the movement command. When the unique identifier of the movement command is the same as at least one of the identifiers included in the storage, the controller may determine that the unique identifier of the movement command is not unique and may terminate the operation.

In operation 440, the communication device may transmit a command set to the controller based on when the effective time of the movement command is valid and the unique identifier of the movement command is unique. Thereafter, when the command set is received from the communication device, the controller may control the operation of the robot based on the movement command included in the command set.

Figure 5:
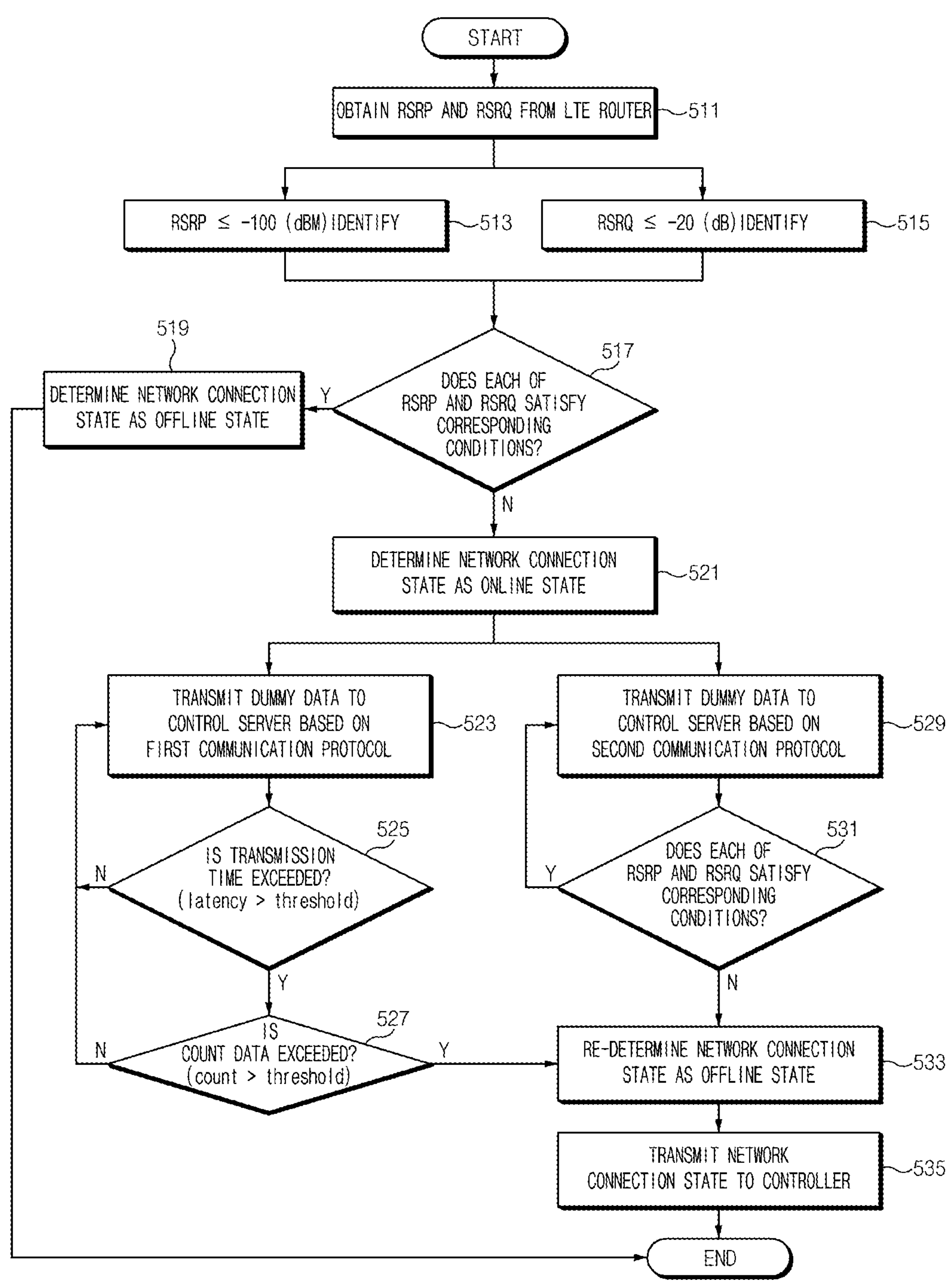
FIG. 5 is a flowchart describing a method of determining a network connection state in a robot according to an embodiment of the present disclosure.

FIG. 5 is a flowchart describing a method of determining a network connection state in a robot according to an embodiment of the present disclosure.

In operation 511, the robot (e.g., the robot 100 in FIG. 1) may further include an LTE router that communicates with the network device (e.g., the network device 150 in FIG. 1). The network device may obtain a reference signal received power (RSRP) and a reference signal received quality (RSRQ) from the LTE router. For example, the network device may obtain the RSRP and RSRQ of the LTE router based on when the communication device (e.g., the communication device 130 in FIG. 1) receives a command set from the control server (e.g., the control server 140 in FIG. 1) and the command set is transmitted to the controller (e.g., the controller 160 in FIG. 1).

In operations 513 and 515, the network device may determine whether the RSRP is less than or equal to a first threshold (e.g., −100 dBm) and the RSRQ is less than or equal to a second threshold (e.g., −20 dB) that is different from the first threshold. However, since the first threshold and the second threshold are values that may change depending on the settings of the components, the values are not limited thereto.

In operation 517, the network device may determine whether the RSRP satisfies the first threshold or less and the RSRQ satisfies the second threshold or less that is different from the first threshold.

In operation 519, the network device may determine the network connection state between the communication device and the control server as the offline state based on the RSRP being less than or equal to the first threshold and the RSRQ being less than or equal to the second threshold that is different from the first threshold.

In operation 521, the network device may determine the network connection state between the communication device and the control server as the online state based on the RSRP exceeding the first threshold or the RSRQ exceeding the second threshold. In detail, operations 517 to 521 may include operations related to the first determination of the network connection state between the communication device and the control server. The network device may more quickly determine the network connection state through the RSRP and the RSRQ of the LTE router.

Thereafter, when the network connection state between the communication device and the control server is determined as the online state, the network device may perform a second determination that re-determines the network connection state between the communication device and the control server based on the setting of the first communication protocol and the setting of the second communication protocol.

In operation 523, the network device may transmit dummy data to the control server based on the first communication protocol. Thereafter, in operation 525, the network device may increase count data at predetermined unit intervals based on a transmission time (e.g., illustrated as a 'latency' in FIG. 5) of the dummy data exceeding a first target threshold (e.g., illustrated as a 'threshold' in operation 525 of FIG. 5). In operation 527, the network device may determine whether the count data (e.g., illustrated as a 'count' in FIG. 5) exceeds a second target threshold (e.g., illustrated as a 'threshold' in operation 527 of FIG. 5) based on the transmission time of the dummy data exceeding the first target threshold. In operation 533, the network device may re-determine the network connection state between the communication device and the control server as the offline state based on the count data exceeding the second target threshold.

In operation 529, the network device may transmit the dummy data to the control server based on the second communication protocol. In this case, the dummy data transmitted based on the first communication protocol may be different from the dummy data transmitted based on the second communication protocol. For example, the network device may transmit random dummy data to the control server at predetermined time intervals based on the second communication protocol. In operation 531, the network device may check whether dummy data is transmitted. In operation 533, the network device may re-determine the network connection state between the communication device and the control server as an offline state based on the dummy data not being transmitted to the control server.

In operation 535, the network device may transmit the re-determined network connection state to the controller. Thereafter, the controller may perform a command (or mechanism) corresponding to the evasive movement based on when the re-determined network connection state is the offline state.

Figure 6:
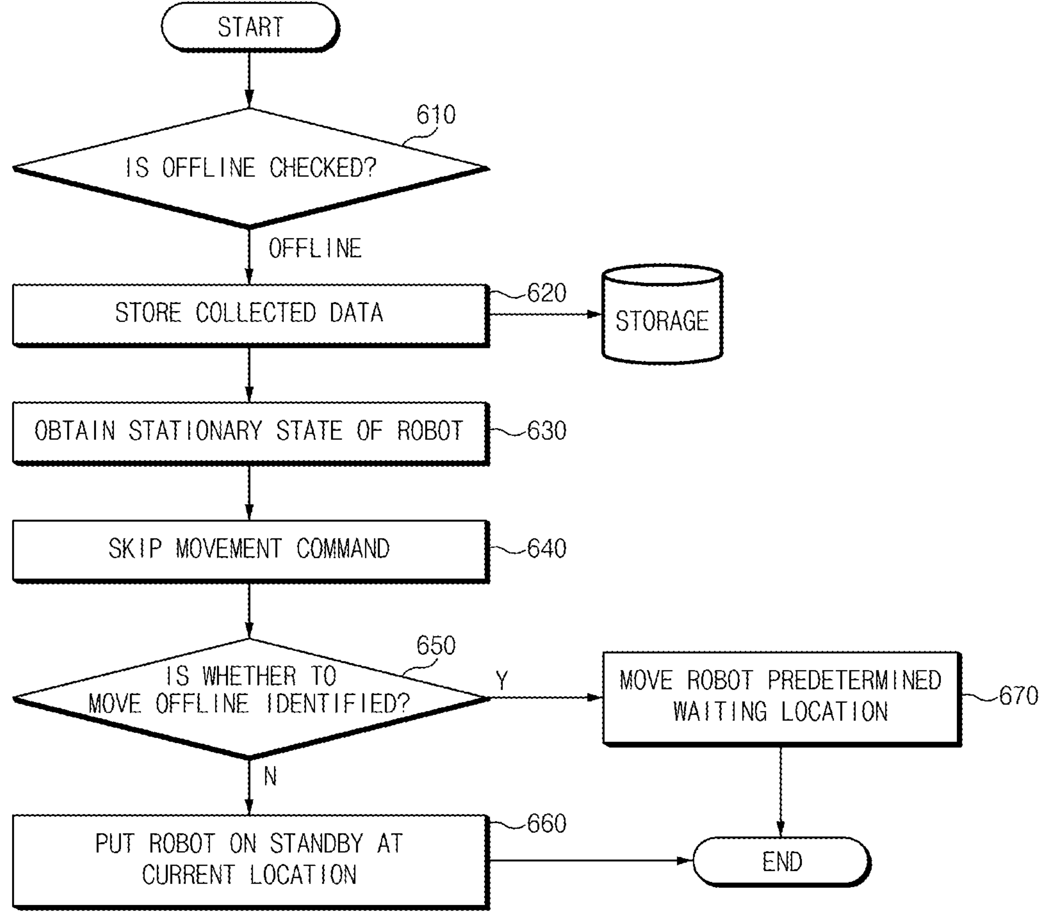
FIG. 6 is a flowchart describing a method of controlling a robot when a network connection state is offline in a robot according to an embodiment of the present disclosure.

FIG. 6 is a flowchart describing a method of controlling a robot when a network connection state is offline in a robot according to an embodiment of the present disclosure.

In operation 610, the controller (e.g., the controller 160 in FIG. 1) may determine whether the network connection state between the communication device (e.g., the communication device 130 in FIG. 1) and the control server (e.g., the control server 140 in FIG. 1) is the offline state. For example, the controller may transmit an offline check request to the network device (e.g., the network device 150 in FIG. 1). Thereafter, the controller may receive the determined network state from the network device. The controller may check the offline state based on the received network state. In this case, when the network state is online, the controller may continue monitoring as communication between the control server and the communication device operates normally.

In operation 620, the controller may store the collected data in the storage. For example, the controller may store the collected data obtained by the robot in the storage from the target time when the network connection state between the communication device and the control server is determined as the offline state. As will be described later in FIG. 7 below, the controller may request synchronization with the control server by transmitting the collected data obtained from the target time to the communication device from the time when the state is changed to the online state.

In operations 630 and 640, the controller may skip the movement command when the robot is in a stationary state from the target time. Thereafter, the controller may control the operation of the robot depending on whether to move offline based on when the movement command is skipped.

In operation 650, the controller may identify whether to move offline. For example, the controller may identify whether to move offline of the robot depending on whether to move offline received from the control server based on when the network connection state between the communication device and the control server is online.

In operation 660, when a value of whether to move offline indicates that the robot is unable to move, the controller may control the operation of the robot at the robot's location. In detail, when the value of whether to move offline indicates that the robot is unable to move, the controller may allow the robot to wait at the current location of the robot.

In operation 670, when the value of whether to move offline indicates that the movement of the robot is possible, the controller may control the operation of the robot such that the robot may move to a predetermined waiting location. That is, the controller may perform the operations included in operation 670, thereby executing a command (or a mechanism) corresponding to the evasive movement of the robot.

Figure 7:
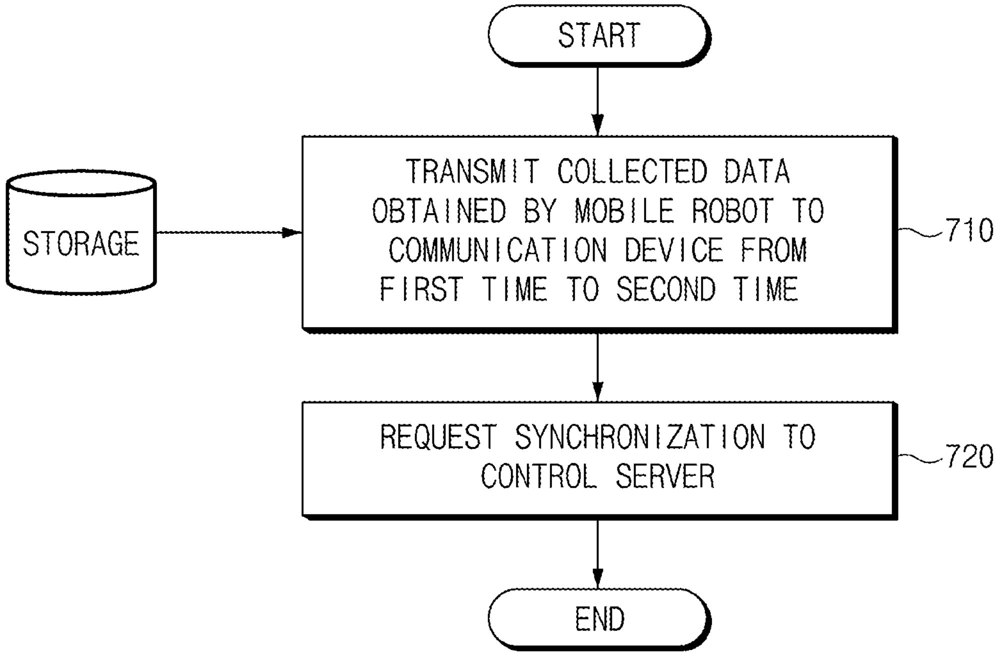
FIG. 7 is a flowchart describing a method of requesting synchronization from a control server when a network connection state changes from offline to online in a robot according to an embodiment of the present disclosure.

FIG. 7 is a flowchart describing a method of requesting synchronization from a control server when a network connection state changes from offline to online in a robot according to an embodiment of the present disclosure.

In operation 710, the controller (e.g., the controller 160 in FIG. 1) may transmit collected data obtained by a mobile robot from a first time to a second time to the communication device. In detail, the controller may perform synchronization for network recovery between the control server and the robot by transmitting the collected data to the communication device.

In operation 720, the communication device (e.g., the communication device 130 in FIG. 1) may request synchronization between the control server and the robot by transmitting the collected data to the control server based on receiving the collected data from the controller.

FIG. 8 is a diagram illustrating characteristics of RSRP and RSRQ of an LTE router included in a robot according to an embodiment of the present disclosure.

Referring to FIG. 8, a first table 810 includes the characteristics of the RSRP of the LTE router. For example, the network device (e.g., the network device 150 in FIG. 1) may determine that a strength of a signal that may check the network connection state is strong, when the RSRP is −80 dBm or more. The network device may determine that the strength of the signal that may check the network connection state is somewhat strong when the RSRP is −80 dBm to −90 dBm. The network device may determine that the strength of the signal that may check the network connection state is somewhat weak when the RSRP is −90 dBm to −100 dBm. Finally, the network device may determine that there is no strength of the signal to check the network connection state when the RSRP is −100 dBm or less.

A second table 820 includes the RSRQ characteristics of the LTE router. For example, the network device may determine that the strength of the signal that may check the network connection state is strong when the RSRQ is −10 dB or more. The network device may determine that the strength of the signal that may check the network connection state is somewhat strong when the RSRQ is −10 dB to −15 dB. The network device may determine that the strength of the signal that can confirm the network connection state is somewhat weak when the RSRQ is −15 dB to −20 dB. Finally, the network device may determine that there is no strength of the signal to check the network connection state when the RSRQ is −20 dB or less.

Therefore, the network device may determine whether the RSRP is less than or equal to the first threshold (e.g., −100 dBm) and the RSRQ is less than or equal to the second threshold (e.g., −20 dB) that is different from the first threshold. The network device may determine (i.e., it is determined that there is no strength of the signal) the network connection state between the communication device and the control server as the offline state based on the RSRP being less than the first threshold and the RSRQ being less than the second threshold that is different from the first threshold.

Figure 9:
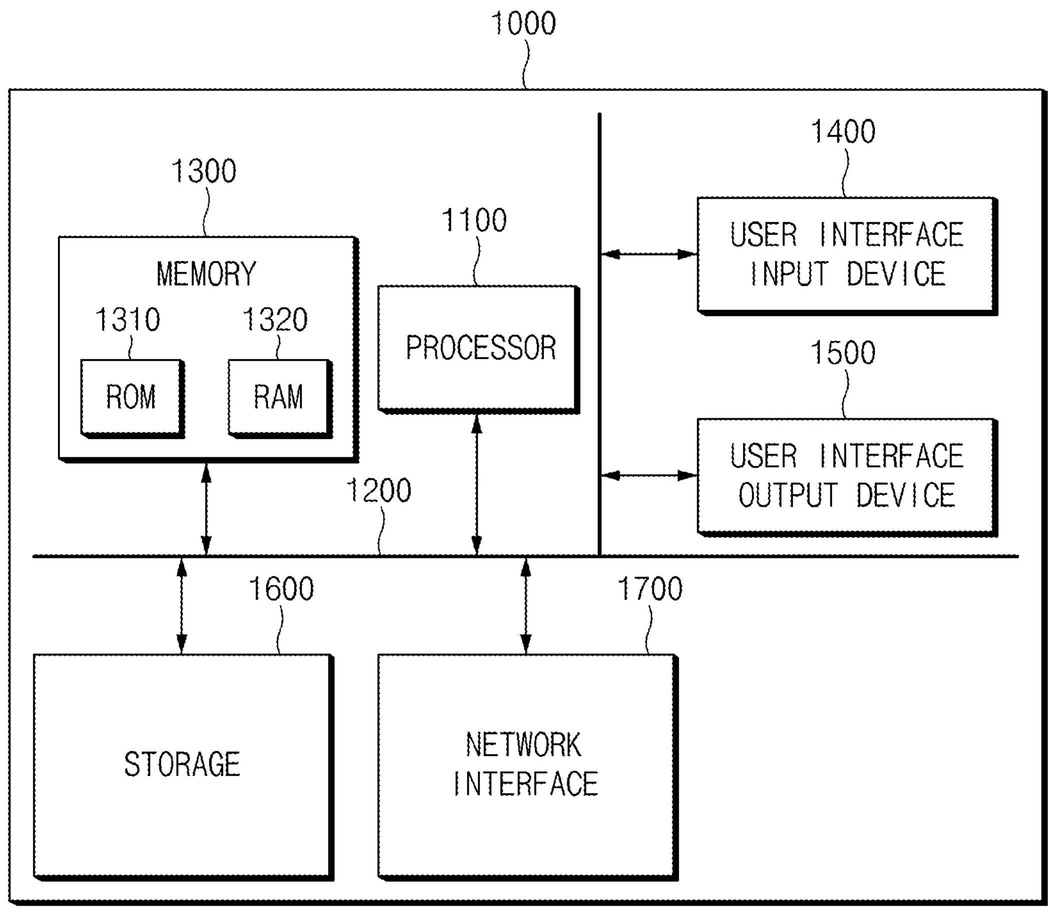
FIG. 9 is a diagram illustrating a computing system related to a robot or a robot control method according to an embodiment of the present disclosure.

FIG. 9 is a diagram illustrating a computing system related to a robot or a robot control method according to an embodiment of the present disclosure.

Referring to FIG. 9, a computing system 1000 related to a robot or a robot control method may include at least one processor 1100, a memory 1300, a user interface input device 1400, a user interface output device 1500, storage (i.e., a memory) 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM).

The storage medium as an example may be coupled to the processor 1100. The processor 1100 may read out information from the storage medium and may write information into the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

The above description is merely illustrative of the technical idea of embodiments of the present disclosure, and those of ordinary skill in the art to which the present disclosure pertains will be able to make various modifications and variations without departing from the essential characteristics of the embodiments of the present disclosure.

The above-described embodiments may be implemented with hardware elements, software elements, and/or a combination of hardware elements and software elements. For example, the devices, methods, and elements described in the embodiments may be implemented by using general-use computers or special-purpose computers, such as a processor, a controller, an arithmetic logic unit (ALU), a digital signal processor, a microcomputer, a field programmable array (FPA), a programmable logic unit (PLU), a microprocessor, or any device which may execute instructions and respond. A processing device may perform an operating system (OS) or software applications running on the OS. Further, the processing unit may access, store, manipulate, process, and generate data in response to execution of software. It will be understood by those skilled in the art that although a single processing unit may be illustrated for convenience of understanding, the processing unit may include a plurality of processing elements and/or a plurality of types of processing elements. For example, the processing device may include a plurality of processors or one processor and one controller. Also, the processing unit may have a different processing configuration, such as a parallel processor.

Software may include computer programs, codes, instructions, or one or more combinations thereof and configure a processing unit to operate in a desired manner or independently or collectively control the processing unit. Software and/or data may be permanently or temporarily embodied in any type of machine, components, physical equipment, virtual equipment, computer storage media or units, or transmitted signal waves so as to be interpreted by the processing unit or to provide instructions or data to the processing unit. Software may be dispersed throughout computer systems connected via networks and be stored or executed in a dispersion manner. Software and data may be stored in a computer-readable recording medium.

The methods according to the above-described embodiments of the inventive concept may be recorded in a computer-readable medium including program instructions that are executable through various computer devices. The computer-readable medium may include program instructions, data files, data structures, etc., singly or in combination, and the program instructions recorded on the medium may be specially designed and constructed for the embodiment or may be known and available to those skilled in the art of computer software. The computer-readable medium may include magnetic media such as hard disks, floppy disks, and magnetic tapes, optical media such as CD-ROMs and DVDs, magneto-optical media such as floptical disks, and hardware devices that are specially configured to store and execute program instructions, such as ROMs, RAMs, flash memories, etc., as an example. Examples of computer programs include not only machine language codes generated by a compiler but also high-level language codes that are capable of being executed by a computer by using an interpreter or the like.

The above-described hardware devices may be configured to act as one or a plurality of software modules to perform the operations of the above-described embodiments of the present disclosure or vice versa.

Even though the embodiments are limitedly described with reference to drawings, it may be obvious to one skilled in the art that the embodiments are variously changed or modified based on the above description. For example, adequate effects may be achieved even if the foregoing processes and methods are carried out in different order than described above, and/or the aforementioned elements, such as systems, structures, devices, or circuits, are combined or coupled in different forms and modes than as described above or are substituted or switched with other components or equivalents.

Therefore, other implements, other embodiments, and equivalents of the claims also fall within the scope of the claims described below.

The effects of the robot and robot control method according to embodiments of the present disclosure will be described as follows.

According to at least one of the embodiments of the present disclosure, there are effects that may be suitable for large-scale communication processing, may be optimized for high throughput and real-time data processing, may operate asynchronously, may support bidirectional streams by communicating with a control server based on a first communication protocol and a second communication protocol, may compensate for the shortcomings of the general MQTT protocol, and may prevent the robot from receiving incorrect commands by minimizing data loss.

In addition, according to at least one of the embodiments of the present disclosure, there are effects that may perform exception scenarios for commands being executed and may ensure robot safety and service quality by determining the network connection state at least twice based on the settings of the first communication protocol and the settings of the second communication protocol.

In addition, according to at least one of the embodiments of the present disclosure, there are effects that may control the operation of the robot based on the network connection state determined by the network device, may perform synchronization with the control server when the network connection state is restored from the offline state to the online state, and may automatically resume the last command and/or task being performed.

In addition to this, various effects identified directly or indirectly through this specification may be provided.

Accordingly, embodiments of the present disclosure are not intended to limit the technical spirit of the present disclosure but are provided only for illustrative purposes, and the scope of the technical spirit of the present disclosure is not limited by these embodiments. The scope of protection of the embodiments of the present disclosure should be construed by the attached claims, and all equivalents thereof should be construed as being included within the scope of the present disclosure.

What is claimed is:

1. A method of controlling a robot, the method comprising:

communicating with a control server based on a first communication protocol and a second communication protocol;

determining a network connection state between a communication device and the control server based on a first setting of the first communication protocol and a second setting of the second communication protocol; and controlling an operation of the robot based on the determined network connection state, wherein:

the network connection state includes an online state and an offline state, and the network connection state between the communication device and the control server is determined further based on;

a first comparison result between a reference signal received power (RSRP) of a long-term evolution (LTE) router and a first threshold; or a second comparison result between a reference signal received quality (RSRQ) of the LTE router and a second threshold different from the first threshold.

2. The method of claim 1, wherein communicating with the control server comprises:

receiving a command set including a movement command from the control server, an effective time of the movement command, a unique identifier of the movement command, and whether to move offline based on the network connection state between the communication device and the control server being online;

determining the effective time of the movement command is valid by comparing a difference between a first time at which the movement command is received and a second time following the first time with the effective time of the movement command; and determining whether the unique identifier of the movement command is unique by comparing the unique identifier of the movement command with identifiers included in a storage device of the robot and corresponding to commands different from the movement command.

3. The method of claim 2, wherein receiving the command set comprises:

receiving the command set from the control server based on the first communication protocol;

transmitting the command set to a controller based on the effective time of the movement command being valid and the unique identifier of the movement command being unique; and controlling the operation of the robot based on the movement command included in the command set.

4. The method of claim 2, further comprising:

storing collected data obtained by the robot from a target time at which the network connection state between the communication device and the control server is determined as the offline state;

skipping the movement command in a case in which the robot is in a stationary state from the target time; and controlling the operation of the robot depending on whether offline movement is performed based on a time at which the movement command is skipped.

5. The method of claim 4, wherein controlling the operation of the robot comprises:

controlling the operation of the robot such that the robot is to be moveable to a predetermined waiting location in response to a value of whether to move offline indicating that the robot is moveable; and controlling the operation of the robot at a location of the robot in response to the value of whether to move offline indicating that the robot is not moveable.

6. The method of claim 1, wherein determining the network connection state comprises:

obtaining the RSRP and the RSRQ of the LTE router based on the communication device receiving a command set from the control server and the command set being transmitted to a controller; and determining the network connection state between the communication device and the control server as the offline state based on the RSRP being less than or equal to the first threshold and the RSRQ being less than or equal to the second threshold.

7. The method of claim 6, further comprising:

determining the network connection state between the communication device and the control server as the online state based on the RSRP exceeding the first threshold or the RSRQ exceeding the second threshold; and re-determining the network connection state between the communication device and the control server based on the first setting of the first communication protocol and the second setting of the second communication protocol in response to the network connection state between the communication device and the control server being determined as the online state.

8. The method of claim 7, wherein re-determining the network connection state comprises:

transmitting random dummy data to the control server at predetermined time intervals based on the first communication protocol;

increasing count data at predetermined unit intervals based on a transmission time of the random dummy data exceeding a first target threshold; and re-determining the network connection state between the communication device and the control server as the offline state based on the count data exceeding a second target threshold.

9. The method of claim 7, wherein re-determining the network connection state comprises:

transmitting random dummy data to the control server at predetermined time intervals based on the second communication protocol; and re-determining the network connection state between the communication device and the control server as the offline state based on the random dummy data not being transmitted to the control server.

10. The method of claim 1, further comprising:

transmitting collected data obtained and stored by the robot to the communication device from a first time at which the network connection state between the communication device and the control server is determined as the offline state to a second time at which the network connection state between the communication device and the control server is changed from the offline state to the online state; and requesting synchronization between the control server and the robot by transmitting the stored collected data to the control server.

11. A robot comprising:

a communication device configured to communicate with a control server based on a first communication protocol and a second communication protocol;

a network device configured to determine a network connection state between the communication device and the control server based on a first setting of the first communication protocol and a second setting of the second communication protocol; and a controller configured to control an operation of the robot based on the network connection state determined by the network device, wherein:

the network connection state includes an online state and an offline state, and the network connection state between the communication device and the control server is determined further based on:

a first comparison result between a reference signal received power (RSRP) of a long term evolution (LTE) router and a first threshold; or a second comparison result between a reference signal received quality (RSRQ) of the LTE router and a second threshold different from the first threshold.

12. The robot of claim 11, wherein the communication device is configured to:

receive a command set including a movement command from the control server, an effective time of the movement command, a unique identifier of the movement command, and whether to move offline based on the network connection state between the communication device and the control server being online;

determine whether the effective time of the movement command is valid by comparing a difference between a first time at which the movement command is received and a second time following the first time with the effective time of the movement command; and determine whether the unique identifier of the movement command is unique by comparing the unique identifier of the movement command with identifiers included in a storage device of the robot and corresponding to commands different from the movement command.

13. The robot of claim 12, wherein:

the communication device is configured to:

receive the command set from the control server based on the first communication protocol; and transmit the command set to the controller based on the effective time of the movement command being valid and the unique identifier of the movement command being unique; and the controller is configured to:

control the operation of the robot based on the movement command included in the command set at a time the command set from the communication device is received.

14. The robot of claim 12, wherein the controller is configured to:

store collected data obtained by the robot from a target time at which the network connection state between the communication device and the control server is determined as the offline state;

skip the movement command in a case in which the robot is in a stationary state from the target time; and control the operation of the robot depending on whether offline movement is performed based on a time at which the movement command is skipped.

15. The robot of claim 4, wherein the controller is configured to:

control the operation of the robot such that the robot is to be moveable to a predetermined waiting location in response to a value of whether to move offline indicating that the robot is moveable; and control the operation of the robot at a location of the robot in response to the value of whether to move offline indicating that the robot is not moveable.

16. The robot of claim 11, wherein:

the robot further includes the LTE router configured to perform communication with the network device; and the network device is configured to:

obtain the RSRP and the RSRQ of the LTE router based on the communication device receiving a command set from the control server and the command set being transmitted to the controller; and determine the network connection state between the communication device and the control server as offline state based on the RSRP being less than or equal to the first threshold and the RSRQ being less than or equal to the second threshold.

17. The robot of claim 16, wherein the network device is configured to:

determine the network connection state between the communication device and the control server as the online state based on whether the RSRP exceeds the first threshold or the RSRQ exceeds the second threshold; and re-determine the network connection state between the communication device and the control server based on the first setting of the first communication protocol and the second setting of the second communication protocol in response to the network connection state between the communication device and the control server being determined as the online state.

18. The robot of claim 17, wherein the network device is configured to:

transmit random dummy data to the control server at predetermined time intervals based on the first communication protocol;

increase count data at predetermined unit intervals based on a transmission time of the random dummy data exceeding a first target threshold; and re-determine the network connection state between the communication device and the control server as the offline state based on the count data exceeding a second target threshold.

19. The robot of claim 17, wherein the network device is configured to:

transmit random dummy data to the control server at predetermined time intervals based on the second communication protocol; and re-determine the network connection state between the communication device and the control server as the offline state based on the random dummy data not being transmitted to the control server.

20. The robot of claim 11, wherein:

the controller is configured to:

transmit collected data obtained and stored by the robot to the communication device from a first time at which the network connection state between the communication device and the control server is determined as the offline state to a second time at which the network connection state between the communication device and the control server is changed from the offline state to the online state; and the communication device is configured to:

request synchronization between the control server and the robot by transmitting the stored collected data to the control server.

* * * * *